Jan. 30, 1962 R. WESTERFELD ET AL 3,019,302

MAGNETIC RECORDING TECHNIQUES

Filed July 16, 1958

INVENTORS
RALPH WESTERFELD
KALJU MERI

BY Kenyon & Kenyon

ATTORNEYS 3,019,302
Patented Jan. 30, 1962

3,019,302

MAGNETIC RECORDING TECHNIQUES

Ralph Westerfeld, Oceanside, and Kalju Meri, Elmhurst, N.Y., assignors to Mohawk Business Machines Corporation, Brooklyn, N.Y., a corporation of Maryland Filed July 16, 1958, Ser. No. 748,907
4 Claims. (Cl. 179—100.2)

The present invention relates generally to magnetic recording and reproducing techniques and more particularly to an improved method and apparatus for erasing magnetic recordings.

Magnetic recording involves three fundamental operations, namely, erasure, recording and reproduction or playback. In erasure, the magnetic medium is either neutralized or saturated to obliterate signals previously recorded. Recording is effected by applying the signal to a magnetic head, the signal being superimposed on a biasing current which may be a high-frequency alternating current, whereby the medium as it passes under the influence of the recording head is magnetized in proportion to the variations in signal current. Reproduction is accomplished by passing the recording over a magnetically-sensitive head usually at the same velocity as in recording whereby signals are induced in the head. The medium, as is well known, may be in tape or wire form or any other magnetizable means.

In most applications the erasing operation is performed during the recording process by an erasure head located in advance of the recording head. A previous recording may be wiped out either by saturating the medium with a strong direct-current field or by neutralizing the medium with an alternating-current field.

The best known method of erasure entails alternating-currents in the ultrasonic frequency range. However, magnetic recording equipment which is battery powered, such as portable and miniature recorders, the amount of power required for this erase method is uneconomical and as a practical matter A.C. erasure cannot be used for it would act quickly to drain the battery.

In D.-C. erasure, every portion of the medium entering the erasing head is brought to saturation or a degree of magnetization exceeding the strongest recorded signal. The erasure head may be constituted by a permanent magnet or any electromagnet supplied by direct-current.

The principal disadvantage of the D.-C. erase technique lies in the high magnetization it leaves on the recording tape. If a normal amount of alternating-current bias is employed for subsequent recording, the distortion level will be high. On the other hand, if enough alternating-current bias is used to overcome the pre-magnetization on the tape, a considerable amount of treble response will be lost. And if direct-current bias is used for recording, the hiss level will be objectionably high.

In summary, therefore, within the context of battery operated recorders, A.-C. erasure is impractical because of its excessive current demand and D.-C. erasure is objectionable because of the resulting noise (hiss).

In view of the foregoing, it is the principal object of the present invention to provide an improved method and apparatus for erasing and subsequently recording on a magnetic medium.

More specifically, it is an object of the invention to provide an erasing device for magnetic recordings which makes use of direct-current pulses, whereby the advantages of A.-C. erasure are retained without excessive battery drain.

Also an object of the invention is to provide a recording bias which is composed of both A.-C. and D.-C. components to provide recordings having a favorable signal to noise ratio and relatively good high frequency or treble response.

A further object of the invention is to provide an oscillator circuit which includes the erasure electromagnetic coil and is adapted to generate a high frequency current for both erasure and recording operation, the coil acting as the resonator in the circuit.

For a better understanding of the invention as well as other objects and further features thereof, reference is had to the following detailed description to be read in conjunction with the accompanying drawing, wherein like components in the various views are identified by like reference numerals.

*General description*

Figures 1, 2:
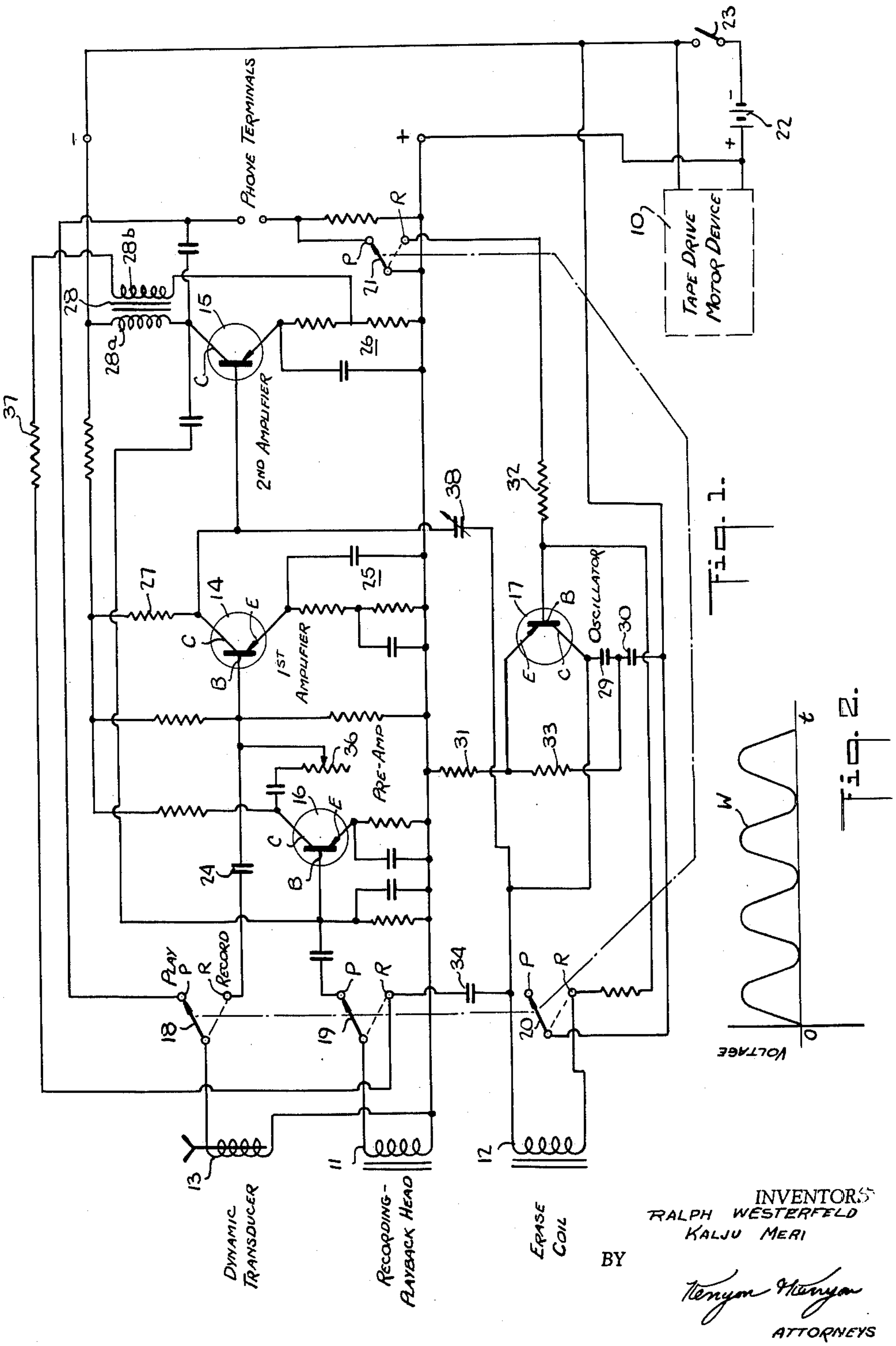
FIG. 1 illustrates schematically a preferred embodiment of the invention.
FIG. 2 is a wave form explanatory of the invention.

Referring now to the drawings, there is disclosed a battery-operated magnetic recording system comprising a motor drive device, generally designated by numeral 10, for conveying a magnetic tape or wire through the varying electromagnetic field generated in a magnetic head 11, previous recordings on the tape being obliterated by an erasure coil 12. The magnetic head is adapted to act in a dual capacity, the head serving selectively as a recording head or as a pick-up head. Also provided is a dynamic transducer 13 which functions not only as a microphone but also as a loud speaker or reproducer. Transducer 13 is of standard design and includes a diaphragm-mounted coil movable within a field coil. Acoustic signals to be recorded are intercepted by dynamic transducer 13 whose output is fed through a two stage amplifier including a first transistor 14 and a second transistor 15, the output of the second stage being fed to the magnetic head 11 when acting as a recording device.

In reproduction, magnetic head 11 serves as a pick-up means, signal induced therein by passage of the recording medium being fed to a pre-amplifier including a transistor 16 and from there to the two stage amplifier formed by transistors 14 and 15. The output of the two stage amplifier is applied to the dynamic transducer 13 acting in this instance as a dynamic speaker. Supersonic alternating current for biasing during recording is generated by an oscillator circuit including transistor 17, the same current also acting to supply a chopped direct-current to the erasure head 12 for purposes of erasure prior to recording.

Switch-over from recording to playback operation is carried out by ganged single-pole double-throw switches 18, 19, 20 and 21, each switch having a movable contact 18*a*, 19*a*, 20*a* nd 21*a*, respectively, adapted to engage upper and lower fixed contacts P (playback) and R (record), respectively. Power for the entire assembly is provided by battery 22 which is connected by a main power switch 23 to the motor tape drive device 10 and to the several transistor circuits.

*Erasure and recording*

We shall first consider the connections of the circuit in the recording position, with switches 18 to 21 being shifted to the R contacts. In this conditions, the dynamic transducer 13 is connected through switch 18 and coupling capacitor 24 to the base B of transistor 14 in the first amplifier stage, the collector C of transistor 14 being connected to the base B in the second stage transistor 15.

The emitters E of transistors 14 and 15 are connected through resistance-capacitance bias circuits 25 and 26 to the positive battery terminal. The collector C of transistor 14 is connected to the negative terminal of the battery through an output resistor 27, while the collector C of transistor 15 is connected to said negative terminal through the primary winding 28*a* of an output transformer 28.

The secondary winding 28*b* of the output transformer 28 is connected at one end in series with a constant-current resistor 37 through switch 19, R contact, to the magnetic head acting as a recorder, and at the other end to an intermediate point in the bias network 26 in the emitter circuit of transistor 15.

During recording, the erasure head 12 is shunted by switch 20 and at the R position across series-connected capacitors 29 and 30 to form a parallel resonant circuit which is connected between the collector C of transistor 17 and the negative terminal of battery 22. The emitter E is connected to the positive battery terminal through resistor 31, while the base is connected to the positive terminal through resistor 32 and switch 21 at the R position, the emitter E being also connected through resistor 33 to the junction of capacitors 29 and 30.

It will be seen that erase coil 12 is connected in the recording position to the battery 22 in series with transistor 17 at the C and E electrodes. The circuit of transistor 17 is analogous to that of a grounded-grid oscillator, as a result of which the direct-current passing through the erase coil is periodically interrupted by the operation of the oscillator.

The rate of oscillation is determined essentially by the inductance of the erase coil and the capacitance thereacross, the resonant frequency being chosen to lie in the supersonic range. As shown in FIG. 2, the wave form W of current through the erase coil is unidirectional by reason of the direct-current flow therethrough, the direct-current flow being chopped or periodically interrupted as shown. As pointed out previously, the chopped D.-C. has the normal advantages of D.-C. erase plus the further benefit that the power requirement therefor is half that for continuous direct-current.

In recording, audio signals picked up by the transducer 13 are amplified by the two-stage amplifier 14, 15 and are applied to magnetic head 11 for recording on the medium passing therethrough. Also applied to the magnetic head 11 is a bias having both an A.-C. and D.-C. component. As to the D.-C. component, it will be seen that one end of head 11 is connected to the positive terminal of the battery, the other end of the head being connected through switch 19 at the R position and the secondary 28*b* of the output transformer to an intermediate point in the bias circuit 26 in the output stage. Thus in addition to the amplified signal appearing in the secondary 28*b*, there is impressed on head 11 a D.-C. component derived from R-C circuit 26.

Applied to the head 11 during recording operation is an ultrasonic frequency A.-C. bias derived through capacitor 34 from the oscillator circuit, thereby superimposing an A.-C. bias component on the D.-C. component. A second A.-C. bias current path is provided through variable capacitor 38 connected to the base circuit of the second amplifier transistor 15, this arrangement serving to reduce the loading of the recording head by the output circuit. In order for the output circuit to constitute effectively no load for the bias applied to the recording head, the bias current flowing through the constant-current resistor 37 must be zero. This is accomplished by adjusting capacitor 38 to that point where the amplified bias voltage reaching the constant current resistor from the second amplifier equals the bias voltage reaching it from switch 19.

The A.-C. and D.-C. components in the recording bias provide an effective compromise between the consequences of A.-C. or D.-C. alone. If a normal amount of A.-C. bias is used in recording subsequent to D.-C. erasure or direct current pulse erasure, the distortion will be high and if enough A.-C. bias to overcome the premagnetization is used, a considerable amount of treble will be lost. On the other hand, if a D.-C. bias is used, the hiss level will be objectionable. The combined A.-C. and D.-C. bias is such that the D.-C. component reduces distortion by reducing the remaining D.-C. magnetization while the A.-C. component reduces the hiss level without being strong enough to endanger the treble response.

*Playback operation*

In playback, the switches 18 to 21 are shifted to the P (playback) positions. In this condition, the transducer 13 is connected to the output of the amplifier stage 15 at the collector electrode C, the transducer now acting as a reproducer. If desired, earphones may be connected to the same output of terminals 35. Switch 21 at the P position disconnects the oscillator transistor 17 from the positive side of the battery, thereby rendering the oscillator inoperative during playback.

The signals induced in playback head 11 are fed through switch 19 in the P position to the base B of the preamplifier transistor 16, the output of this amplifier being taken from the collector circuit and being applied through an adjustable resistor 36 to the base B of the first amplifier transistor 14.

Switch 20 in the P position disconnects erase coil 12 from the negative side of battery 22, thus rendering this coil inoperative.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a magnetic sound recording system for recording a signal on a magnetic medium, the combination of an electromagnetic erasure device and a recording head, said medium during recording travelling successively past said device and said head, a battery oscillator means coupled to said battery and incorporating said device as a frequency determining element to cause an intermittent direct current to flow through said device to effect erasure of a previous recording, and means to apply the signal to be recorded to said head together with a bias voltage having a direct-current component and an ultrasonic alternating current component.

2. In a magnetic sound recording system for recording a signal on a magnetic medium, the combination comprising an electromagnetic erasure device and a recording head, drive means to advance said medium successively past said device and said head during recording, a battery-operated ultrasonic oscillator having a resonant circuit which includes said erasure device, means to derive from said battery a direct-current bias voltage, means coupled to said oscillator to interrupt said bias at an ultrasonic rate to produce an intermittent direct-current bias, means to apply said intermittent bias to said device to effect erasure, and means to apply to said head the signal to be recorded and a bias voltage having a direct-current component together with an ultrasonic component derived from said oscillator.

3. In a magnetic sound recording system for recording a signal on a magnetic medium, an electro-magnetic erasure device having a predetermined inductance, said erasure device being operatively disposed with respect to said medium, a direct current source, transistor means connecting said source to said erasure device, and tuned circuit means including said erasure device to render said transistor means periodically conductive at a rate determined by the inductance of said device whereby direct current from said source flows intermittently in said device.

4. In a magnetic sound recording system for recording a signal on a magnetic medium, an electro-magnetic erasure device having a predetermined inductance, a recording head, said device and said head being operatively disposed with respect to said medium, a direct current source, transistor means connecting said source to said erasure device, and circuit means including said erasure device to render said transistor means periodically conductive at a rate determined by the inductance of said device whereby direct current from said source flows intermittently in said device, and means to apply a signal to be recorded to said head in combination with an alternating current bias derived from said circuit means.

References Cited in the file of this patent

UNITED STATES PATENTS

| | | |
|---|---|---|
| 2,548,109 | Howey | Apr. 10, 1951 |
| 2,596,621 | Van Loon et al. | May 13, 1952 |
| 2,620,403 | Howey | Dec. 2, 1952 |
| 2,898,408 | Folse | Aug. 4, 1959 |

FOREIGN PATENTS

| | | |
|---|---|---|
| 97,306 | Sweden | Nov. 7, 1936 |